United States Patent Office 3,059,506
Patented Oct. 23, 1962

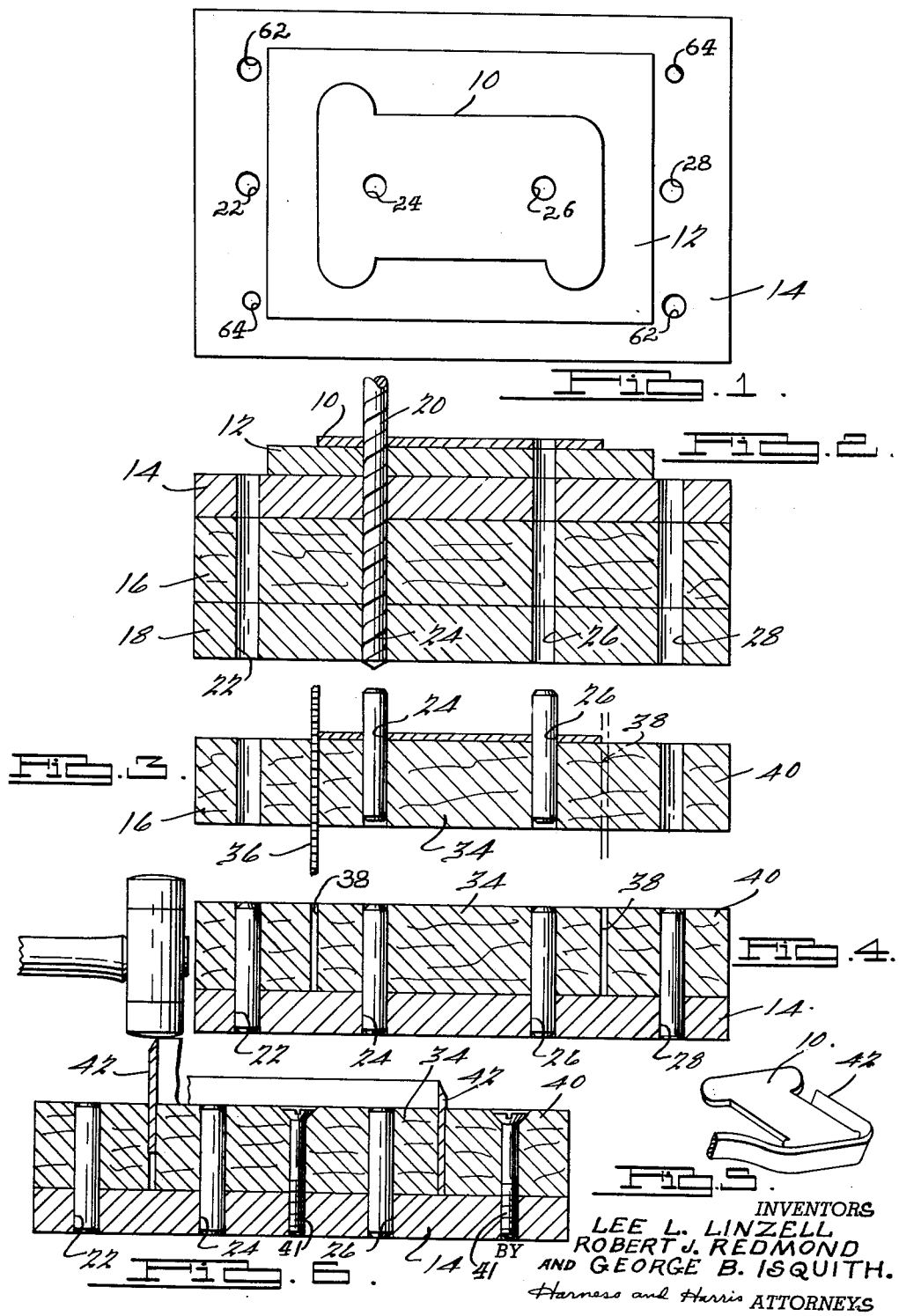

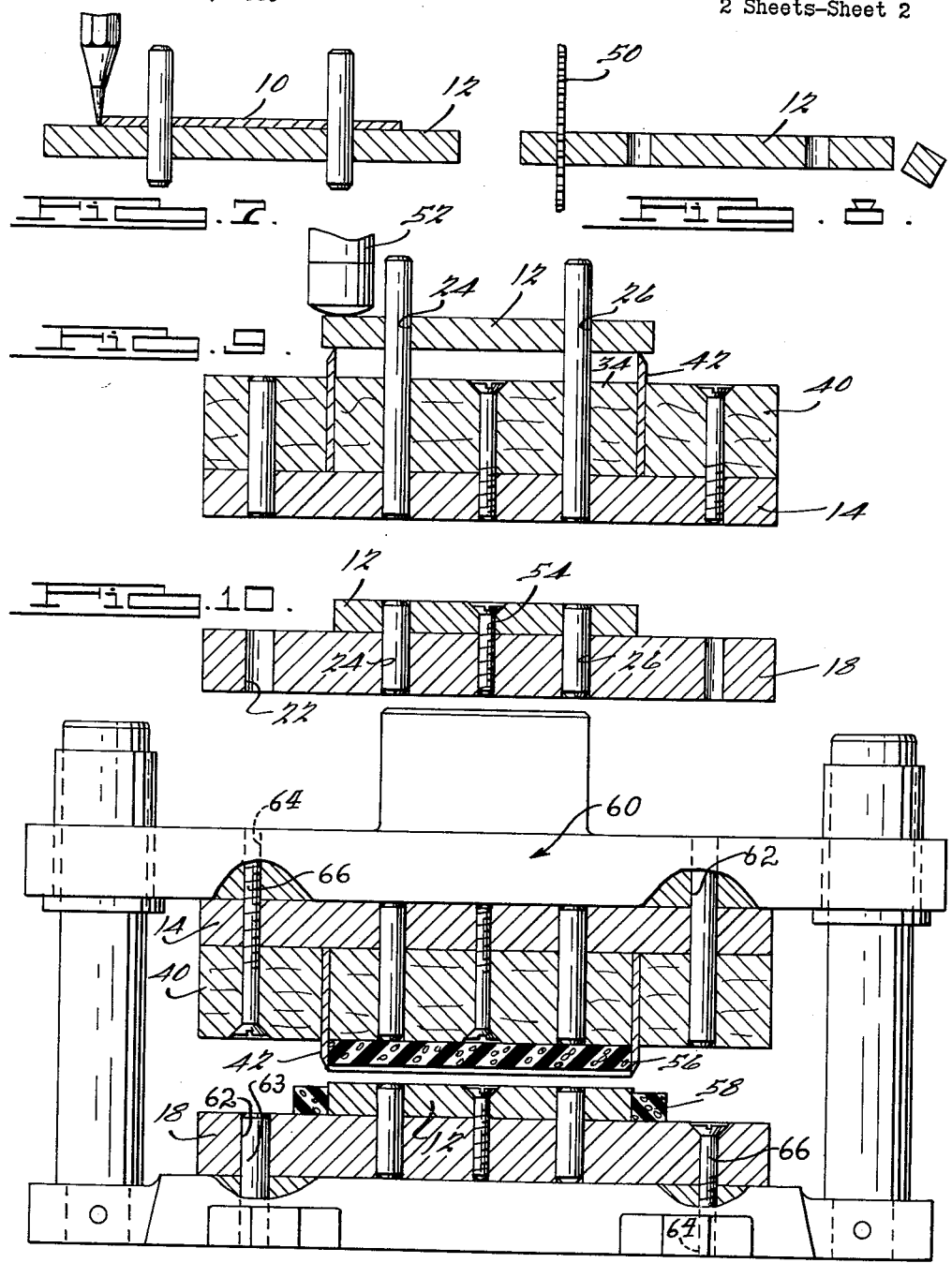

3,059,506
METHOD OF MAKING CUTTING DIES
Lee L. Linzell, 20978 Lahser, Southfield, Mich.; Robert J. Redmond, 11257 Kennebec, Detroit, Mich.; and George B. Isquith, 22988 Shiell, Mount Clemens, Mich.
Filed Oct. 13, 1959, Ser. No. 846,205
1 Claim. (Cl. 76—107)

This invention relates to a method of making cutting dies of the type frequently referred to as steel rule dies.

U.S. Patent 2,495,221 which issued January 24, 1950, to Milton Berlin illustrates one method of making cutting dies. This invention constitutes an improvement over the method therein disclosed.

Dies of the steel rule type have been gaining commercial acceptance for use in stamping parts of various materials including metal wherein it is desired to keep the initial die cost at a minimum and the number of articles to be fabricated from the dies is limited.

It is a principal object of this invention to provide a method of forming dies which can be practiced on a bench without the necessity of tying up a punch press during the die fabrication. The punch press is, of course, a large and expensive piece of equipment which can be better used in the production of work pieces.

It is an additional object of the invention to extensively use dowel holes to govern the fabrication of die components so that the ultimate product will be an operative die set when it is first installed in a punch press.

In the drawings:

FIG. 1 is a plan view of a plurality of component elements stacked preparatory to fabrication of the die set;

FIG. 2 is a vertical section through the stacked elements illustrated in FIG. 1 showing the step of boring dowel holes therein;

FIG. 3 is a vertical section illustrating the step of cutting a die block to the contour of a template;

FIG. 4 is a vertical section illustrating the assembly of inner and outer die block segments on a backing plate;

FIG. 5 shows a blade being formed around a template;

FIG. 6 is a vertical section illustrating the positioning of blade means in the space between the inner and outer die block segments;

FIG. 7 is a vertical section illustrating the marking of the outline of the template on the punch plate;

FIG. 8 is a vertical section illustrating the step of cutting the punch plate slightly oversize relative to the marking imparted in FIG. 7;

FIG. 9 is a vertical section illustrating the step of tapping the punch plate into contact with the exposed blade means to mark the blade contour on the punch plate surface;

FIG. 10 is a vertical section illustrating the assembly of the punch plate and its backing plate; and FIG. 11 is a partial vertical section illustrating the assembly of first and second backing plates and the associated components in a master die set.

Referring to the drawings, and particularly FIGS. 1 and 2, a plurality of components are stacked one above the other. These components preferably include all of the elements of the complete die set with the exception of the steel rule blade which will be discussed. The stacked elements include a template 10 having the external contour of the workpiece to be fabricated, a piece of punch plate stock 12, a first backing plate 14, a die block 16 and a second backing plate 18. The die block 16 is preferably formed of a material which is not too hard to work and one material which is acceptable is hard plywood.

A suitable drilling or boring tool 20 is used to drill a plurality of dowel holes vertically down through the stacked components. The dowel holes illustrated in FIG. 2 have been designated by the numerals 22, 24, 26 and 28. The exact location of these dowel holes is not critical, but their mere existence will serve in subsequent steps in our method as a means to orient the elements relative to each other. It is desirable to locate some of the dowel holes and screw holes at locations corresponding to hole locations in a standard master die set in which these component elements will ultimately be assembled. The master die set is hereinafter referred to.

The die block 16 is selected from the stacked elements and the template is positioned thereon with dowels positioned in dowel holes 24 and 26 to locate the template relative to the die block 16. The die block 16 is then cut to define an inner die block segment 34 having the same plan contour as the template 10. A saw 36 is used to perform this cutting and it is selected so that the width of its blade controls the width of saw cut 38. The saw cut 38 preferably has a width approximating the width of steel rule stock to be referred to herein so that the latter may be driven into the slot in a subsequent step. This step of sawing the die block, as illustrated in FIG. 3, produces the above mentioned inner die block segment 34 and an outer die block segment 40.

As illustrated in FIG. 4 the inner die block segment 34 and the outer die block segment 40 are positioned relative to the first backing plate 14 by means of dowels inserted in dowel holes 22, 24, 26 and 28. The same numerals 22, 24, 26 and 28 are used to designate dowel holes even though these holes penetrate more than one element, such as 12, 14, 16 and 18. The assigning of different numbers for each hole as it appears in each of the elements would be confusing. Suitable screws 41 are used to permanently secure the inner and outer die block segments 34 and 40 to the backing plate 14. It should be noted that the dowels accurately locate these components and that the width of the saw cut 38 separates the inner and outer die block segments.

Commercially procurable steel rule stock 42 is bent around the template 10 as illustrated in FIG. 5. Since the saw cut 38 was also formed around the periphery of the template 10 the steel rule stock 42 and the saw cut 38 will have the same contour in plan view and the next step consists of forcing the steel rule stock 42 into the saw cut 38 as illustrated in the left portion of FIG. 6 to produce an assembly consisting of the first backing plate 14, inner die block segment 34 and outer die block segment 40 with the steel rule stock forming a blade means 42 which projects beyond the surface of the die block segments 34 and 40 to form the female component of the die set.

The formation of the male component of the die set will now be described and it preferably includes using the template 10 as a guide to roughly cut the punch plate 12 to the contour of the template 10. The template and punch plate are oriented by means of dowels as illustrated in FIG. 7 and the outline of the template is marked on the punch plate 12. As illustrated in FIG. 8 the punch plate 12 is then sawed oversize relative to the marked outline by means of a saw 50. The steps illustrated in FIGS. 7 and 8 are merely a means to reducing the punch plate material to approximately the shape of the template and it is contemplated that the cut made by the saw 50 will be oversize relative to the template. It is conceivable that the punch plate material 12 could have been removed from stock with a shape sufficiently close to the shape of the template 10 so that the steps illustrated in FIGS. 7 and 8 could be omitted.

The oversize punch plate 12 preferably then has one surface inked. This would be the lower surface illustrated in FIG. 9 and the dowel holes 24 and 26 in the punch plate 12 are penetrated by dowels which also penetrate corresponding dowel holes in the inner die block 34 and the backing plate 14 to locate the punch plate relative to the blade means 42 as illustrated in FIG. 9. The punch plate is then tapped by a tool 52 until the inked surface thereof is marked by the blade means 42. The punch plate 12 is then finished to the ink mark outlining the contour of blade means 42. The punch plate 12 is then assembled with screws 54 to the backing plate 18 to form the male portion of the die set.

In accordance with conventional practice stripper material such as rubber may be inserted at 56 and 58 to facilitate ejection of the workpiece and stock after the die has made its cut from work stock.

The male and female components of the die set are then assembled as illustrated in FIG. 11 in a master die set 60. As mentioned above and as illustrated by dowel holes 62 in FIGS. 1 and 11 some of the dowel holes in the component die elements mate with dowel holes provided in the master die set. These accommodate long dowels 63. Similarly screw holes 64 are aligned in component die elements and in the master die set to receive screws 66 as illustrated in FIG. 11. Such master die sets are well known commercial devices.

It should be noted that the above steps are capable of performance by a workman with hand tools and bench apparatus. There is no necessity to tie up large punch presses during the steps of forming the cutting dies by the above described method.

We claim:

A method of making a set of dies comprising the steps of stacking a plurality of components including first and second backing plates, a die block, a punch plate and a template, boring a plurality of dowel holes through all of the components while they are still stacked, disassembling the components, placing the template on the die block, inserting dowels in the dowel holes in the template and die block, cutting the die block to the contour of the template to form outer and inner die block segments, assembling the inner and outer die block segments with blade means in strip form therebetween with an exposed portion of the blade means protruding from the die block segments throughout the length of the blade means and with the inner and outer die block segments located on the first backing plate by means of the previously formed dowel holes and with the blade means received in the space formed by the above mentioned cut, locating the punch plate relative to the above mentioned first backing plate by means of some of the previously bored dowel holes, moving the punch plate into contact with the exposed blade means carried by the first backing plate to mark the blade contour on the punch plate surface, finishing the punch plate to the marked contour, locating the punch plate on the second backing plate by means of some of the previously bored dowel holes and securing it thereto.

References Cited in the file of this patent

UNITED STATES PATENTS

| | | |
|---|---|---|
| 2,495,221 | Berlin | Jan. 24, 1950 |
| 2,703,023 | Sarno | Mar. 1, 1955 |
| 2,873,627 | Smith | Feb. 17, 1959 |
| 2,899,849 | Laughter et al. | Aug. 18, 1959 |
| 2,927,190 | Dulebohn et al. | Mar. 1, 1960 |